United States Patent

Pescuma et al.

[15] 3,665,738
[45] May 30, 1972

[54] IGNITION LOCK

[72] Inventors: Gerald F. Pescuma, Salem; Alphonse J. Durso; Walter T. Brown, both of Lynn, all of Mass.

[73] Assignee: General Products and Gear Co., Inc., Lynn, Mass.

[22] Filed: July 20, 1970

[21] Appl. No.: 56,480

[52] U.S. Cl. .................................70/211, 70/237, 70/427, 200/44
[51] Int. Cl. ................B60r 25/04, E05b 13/00, H01h 27/06
[58] Field of Search....................70/423, 424, 425, 426, 427, 70/428, 18, 19, 36, 37, 209, 211, 212, DIG. 58, 237, 254, 177, 178, 179, 180, 185, 186; 200/42, 61.54

[56] References Cited

UNITED STATES PATENTS

| 1,329,391 | 2/1920 | Folster | 70/252 |
| 1,590,981 | 6/1926 | Lockyer | 70/237 |
| 1,530,814 | 3/1925 | Credle | 70/178 |
| 1,828,658 | 10/1931 | Henke | 70/18 X |
| 1,213,811 | 1/1917 | Smith | 200/61.54 |

FOREIGN PATENTS OR APPLICATIONS 115,542 12/1929 Austria ..................................70/177

*Primary Examiner*—Albert G. Craig, Jr.
*Attorney*—Richard P. Crowley and Richard L. Stevens

[57] ABSTRACT

An ignition switch lock for automobiles which comprises an encircling band secured in an immovable manner to a steering column. A portion of the band comprises a pivotable blocking arm. When the blocking arm is in a closed or locked position, it engages the ignition switch and prevents entry of a key into the ignition switch. When the blocking arm is in an unlocked open position, a key may be freely inserted in the ignition switch.

7 Claims, 3 Drawing Figures

Patented May 30, 1972  3,665,738
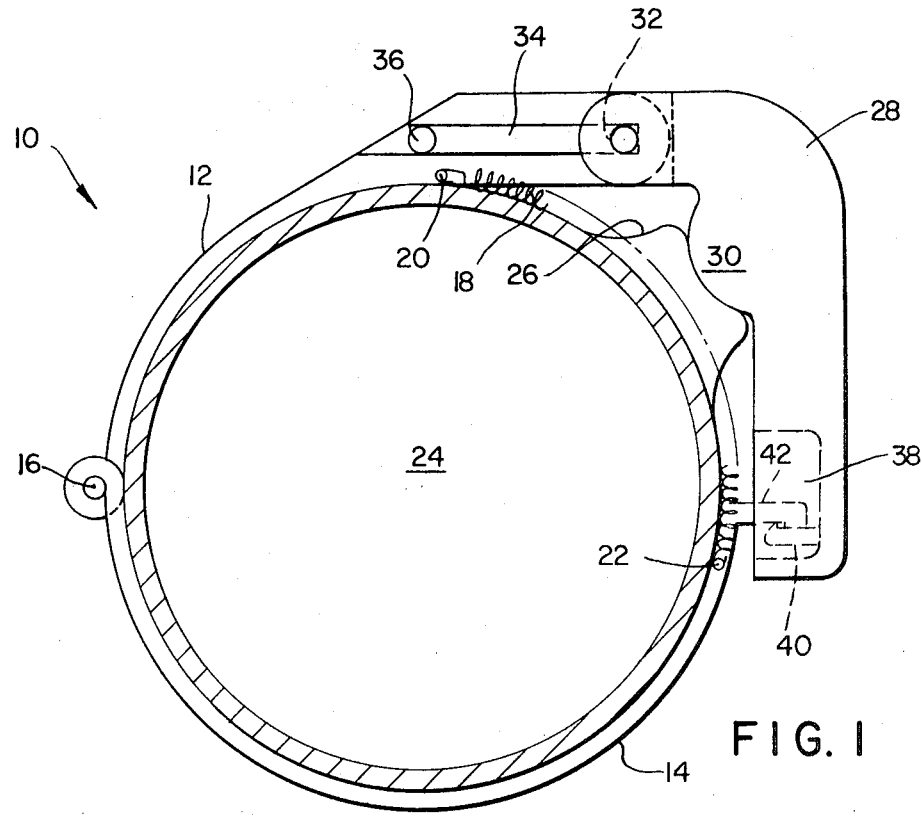
FIG. 1
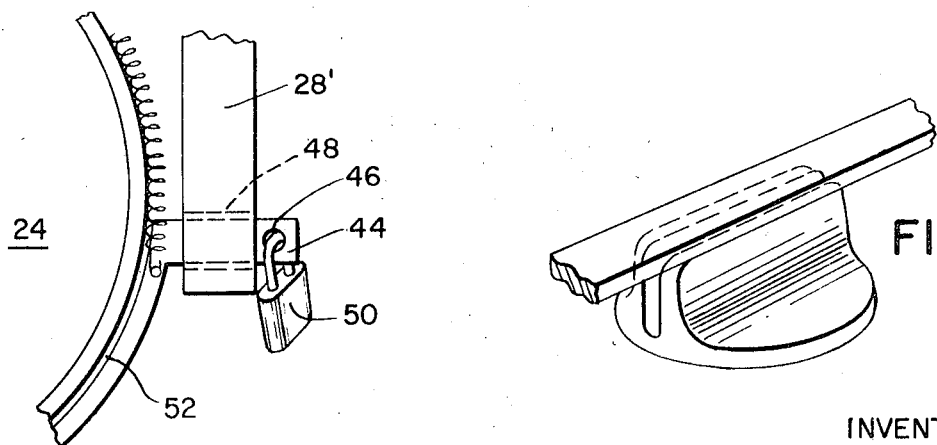
FIG. 2
FIG. 3
INVENTORS
GERALD F. PESCUMA
ALPHONSE J. DURSO
WALTER T. BROWN
BY Crowley & Stevens
ATTORNEY

3,665,738

1
IGNITION LOCK

BACKGROUND OF THE INVENTION

Presently, the rate of car theft is alarmingly high. Generally, there are two groups of people or individuals who are involved in car thefts; either the professionals where the car is taken for resale, or the nonprofessionals where the car is primarily taken for weekend or hourly excursions and then abandoned. The primary means used by professionals to steal cars is to either secure master keys from the manufacturers through any of various methods and simply match the particular model number with the master key and drive the car away, or they employ specialized equipment to make wax impressions for the type of key required for the ignition lock and then on the spot make a key for the ignition lock from a fairly standard blank. The nonprofessional customarily jumps the ignition wires. If a device were available which secured or blocked the ignition switch in such a way that the ignition switch could not be removed to jump the wires or insertion of a key or wax into the ignition switch could be prevented, then the rate of car thefts could be significantly reduced. Prior art locking devices to prevent entry of a master key into an ignition have been suggested but they are generally quite complicated, costly, and require securing some device or apparatus physically to the housing in which the ignition switch is disposed, such as through bolting, welding, or otherwise. For example, U.S. Pat. No. 1,956,438 discloses a device for protecting motor cars against theft. Although this reference does not teach preventing entry of a key into an ignition switch, it is representative of various devices which are complex and costly. The device disclosed completely encircles a column and is fixably secured thereto and when locked prevents movement of the steering wheel relative to the column.

U.S. Pat. No. 1,179,419 discloses a device for protecting a key hole by enclosing the key with a band-like member. However, this device does not completely encircle a steering column to block the ignition switch nor is it readily removable.

Accordingly, the prior art devices being difficult to install or incorporate into the car and costly, most car owners apparently have felt that rather than pay the price to have the particular locking devices installed, it is worth running the risk of having the car stolen.

SUMMARY OF THE INVENTION

Our invention is a simple inexpensive ignition switch locking device primarily adapted for locking ignition switches disposed on steering columns, which overcomes the difficulty of prior art devices. Briefly, our invention comprises a circumferential band structure which preferably engages in a frictional manner the steering column of an automobile. The band structure includes at least one removable section, which section may be locked into place to block entry of a key into the ignition switch. As used in this description, the term ignition switch includes the structure which provides for entry of a key therein whereby through movement of the key an ignition process may be initiated. The materials of construction of the encircling band and removable section are such that the device cannot be pried or forced off the steering column or removed without sophisticated cutting techniques, such as torches, etc. The removable section engages the ignition switch preferably by having a protuberance thereon, which protuberance mates with the recessed section of the ignition switch. In one embodiment a lock of the car owner's choice may be used to secure the device about the steering column which lock would not be readily susceptible to opening by a commonly obtained master key.

BRIEF DESCRIPTION OF THE DRAWINGS

FIG. 1 is a schematic and partial sectional view of one embodiment of the invention;

FIG. 2 is a fragmentary sectional view of an alternative embodiment of the invention of FIG. 1; and FIG. 3 is a fragmentary sectional view of a further alternative embodiment of FIG. 1.

2
BRIEF DESCRIPTION OF THE PREFERRED EMBODIMENTS

Our invention is shown generally at 10 and comprises a first arcuate section 12 and a second arcuate section 14 secured one to the other by pivot pin 16. A spring 18 is secured to the other ends of the sections 12 and 14 in a releasable manner at 20 and 22, respectively, to form a completely encircling band about steering column 24. The spring 18 may be located above or beyond the ignition switch 26 of the steering column and as shown is located or disposed slightly above the ignition switch 26. A blocking arm 28 having a protuberance 30 thereon, which protuberance mates with the recess of the ignition switch 26, is pivotally secured by pin 32 to one end of the arcuate section 12. The arm 28 when in an open or unlocked position is adapted to travel along track 34 until it reaches stop pin 36. A locking mechanism 38 is disposed in the other end of the blocking arm 28.

As shown, the lock 38 disposed in the arm 28 is a security-type lock and includes a hook-type element 40. This hook-type element 40 is adapted to engage a corresponding hook-type element 42, the element 42 extending from one end of the arcuate section 14. As shown in FIG. 1, the device may be placed about the steering column by securing the spring 18 at 20 and 22 to each of the arcuate arm sections. When the car is not locked for security purposes, then the arm 28 is pivoted about pin 32, and depending upon the particular construction of the steering column, type of transmission, and steering wheel structure, the blocking arm 28 may be simply pivoted away from the ignition switch or slid back as desired. When it is desired to securely lock the ignition switch 26, then the blocking arm 28 is brought down and the protuberance 30 engages the recess in the ignition switch 26 and the locking lug 40 engages the hook-type member 42 and is locked in place. If desired, any locking arrangement may be used such as for example, a cylinder-type with camming action and a locking pawl.

Although the blocking arm has been shown with the protuberance engaging the recess in the ignition switch 26, a protuberance may not be used as long as the blocking arm serves to prevent entry of a key into the ignition lock. However, a protuberance is preferred in that this would provide a close engaging fit of the entire device completely around the steering column and would prevent the easy insertion of screw drivers, wrenches, or cutting instruments in a position between the exterior of the steering column and the inside of the device. Also, as shown in FIG. 3, the blocking arm can be arranged so that it crosses between the raised portions of the ignition switch commonly found on some steering columns. Again, this may be designed to ensure this complete close fit completely around the steering column. Although a spring 18 has been used as being the flexible or releasable member, it is obvious that another solid arcuate section may be used or chain-like section may be used as desired. However, the spring-like member has been found to most convenient to accomodate circumferential differences in steering columns of various models of automobiles. The materials of construction of the spring member 18, arcuate sections 12 and 14, and blocking arm 28, are constructed of any formable or substantial material, such as strap, forged, or case hardened steel, or any other material heat-treated for strength and durability. Although shown as comprising two arcuate sections 12 and 14 pivotally joined, these sections may be comprised of only one section which section may be sprung open, placed about the steering column, and then released.

Referring to FIG. 2, an alternative embodiment of our invention is shown wherein the arcuate section 14 is characterized by an L-shaped extending portion 44. The blocking arm 28 is characterized by an aperture 48 therein through which aperture the L-shaped extending section 44 passes. A padlock 50 is inserted through an opening 46 in the section 44 to lock the blocking arm 28' into place. Further, the inner portion of the arcuate sections 12 and 14, and the blocking arm 28' are characterized by a surface 52. The surface may form a dual function in preventing abrasion to the steering column when the locking device is used, and it also may have frictional characteristics which would enhance the frictional engagement of the device to the steering column to prevent its dislodgement, such as polymeric resinous materials to include foam materials, elastomeric-type compounds etc.

Having described our invention, what we now claim is:

1. An ignition switch locking device which comprises a first arcuate section adapted to encircle partially and engage a steering column, which column has an ignition switch thereon;
   a second arcuate section adapted to encircle partially and engage a steering column;
   means to secure the second arcuate section at one end thereof to the first arcuate section;
   means to secure the other end of the second section to the first section to provide a completely encircling band about the column; and
   a blocking arm secured to the first section in a movable manner and secured to the second section in a locking manner, said arm adapted to move from an open position to allow entry of a key into the switch to a closed locking position engaging the switch to prevent entry of a key in the switch.

2. The device of claim 1 wherein one of the means to secure the first and second sections to one another includes means to pivotally secure said sections.

3. The device of claim 1 wherein the movable manner of securement of the blocking arm to the first section is a pivot connection.

4. The device of claim 3 wherein the means secured to said first and second sections to provide a completely encircling band about the steering column in combination with the first and second sections when said blocking arm is in an open position is releasably secured to said sections.

5. The device of claim 3 wherein the blocking arm includes a protuberance thereon, the protuberance adapted to engage in mating relationship a recess in the ignition switch when the blocking arm is in its closed position.

6. The device of claim 3 which includes means disposed in the other end of said blocking arm to lockingly engage with said second section.

7. The device of claim 1 wherein the second section is characterized by an L-shaped extension adapted to pass through an orifice disposed in one end of the blocking arm.

* * * * *